(12) United States Patent
Lemarchand et al.

(10) Patent No.: US 10,787,969 B2
(45) Date of Patent: Sep. 29, 2020

(54) AIRCRAFT TURBOMACHINE FRONT PART

(71) Applicant: SAFRAN AIRCRAFT ENGINES, Paris (FR)

(72) Inventors: Kevin Morgane Lemarchand, Melun (FR); Michel Gilbert Roland Brault, Quincy-sous-Senart (FR); Guillaume Olivier Vartan Martin, Cesson (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 254 days.

(21) Appl. No.: 15/775,880

(22) PCT Filed: Nov. 14, 2016

(86) PCT No.: PCT/FR2016/052942
§ 371 (c)(1),
(2) Date: May 14, 2018

(87) PCT Pub. No.: WO2017/085386
PCT Pub. Date: May 26, 2017

(65) Prior Publication Data
US 2018/0328288 A1 Nov. 15, 2018

(30) Foreign Application Priority Data

Nov. 16, 2015 (FR) ...................................... 15 60973

(51) Int. Cl.
*F02K 3/00* (2006.01)
*F02C 7/36* (2006.01)
(Continued)

(52) U.S. Cl.
CPC .............. *F02C 7/36* (2013.01); *F01D 25/162* (2013.01); *F02C 7/20* (2013.01); *F02K 3/06* (2013.01);
(Continued)

(58) Field of Classification Search
CPC ...... F02C 7/36; F02C 7/20; F02K 3/06; B64D 2027/262
See application file for complete search history.

(56) References Cited

U.S. PATENT DOCUMENTS

| 3,489,338 A | * | 1/1970 | Davies ................ | F04D 29/323 60/226.1 |
| 8,869,504 B1 | * | 10/2014 | Schwarz ................ | F01D 5/06 60/226.1 |

(Continued)

FOREIGN PATENT DOCUMENTS

EP    1 566 522 A1    8/2005

OTHER PUBLICATIONS

International Search Report dated Feb. 1, 2017 in PCT/FR2016/052942 filed Nov. 14, 2016.
(Continued)

*Primary Examiner* — Gerald L Sung
(74) *Attorney, Agent, or Firm* — Oblon, McClelland, Maier & Neustadt, L.L.P.

(57) ABSTRACT

A front part of an aircraft turbomachine of the bypass type including a single fan, a gas generator positioned downstream of the fan, a reducer interposed between the gas generator and the fan, a flow splitter and a structure with structural outlet guide vanes. The vanes each have a root arranged upstream of the flow splitter and the reducer is also arranged at least half upstream of the flow splitter.

12 Claims, 3 Drawing Sheets

(51) Int. Cl.
    *F01D 25/16*     (2006.01)
    *F02K 3/06*      (2006.01)
    *F02C 7/20*      (2006.01)
    *F16H 57/02*     (2012.01)
    *F16H 57/08*     (2006.01)

(52) U.S. Cl.
    CPC ............ *F16H 57/02* (2013.01); *F16H 57/08* (2013.01); *F16H 57/082* (2013.01); *F05D 2260/40311* (2013.01); *F16H 2057/02039* (2013.01); *F16H 2057/085* (2013.01); *Y02T 50/671* (2013.01)

(56) References Cited

U.S. PATENT DOCUMENTS

| | | | |
|---|---|---|---|
| 9,133,729 B1* | 9/2015 | McCune | F02C 7/20 |
| 2005/0241291 A1 | 11/2005 | Bart et al. | |
| 2011/0206498 A1* | 8/2011 | McCooey | F02C 3/107 |
| | | | 415/124.1 |
| 2012/0251306 A1* | 10/2012 | Reinhardt | F01D 25/28 |
| | | | 415/182.1 |
| 2013/0104524 A1 | 5/2013 | Kupratis | |
| 2013/0177385 A1* | 7/2013 | Munsell | F01D 25/16 |
| | | | 415/1 |
| 2014/0271135 A1* | 9/2014 | Sheridan | F02C 3/107 |
| | | | 415/122.1 |
| 2015/0125293 A1* | 5/2015 | Sheridan | F02C 3/107 |
| | | | 415/229 |
| 2017/0314473 A1* | 11/2017 | Morreale | F01D 25/125 |
| 2018/0274443 A1* | 9/2018 | Pointon | F02C 7/06 |

OTHER PUBLICATIONS

French Preliminary Search Report dated Jul. 5, 2016 in French Application 1560973 filed Nov. 16, 2015.

* cited by examiner

AIRCRAFT TURBOMACHINE FRONT PART

TECHNICAL AREA

The present invention relates to the field of high bypass ratio turbofan aircraft turbine engines, wherein the single fan is driven by a gear box. This type of turbomachine is called "slow fan", due to its low speed rotation in comparison with a fan directly driven by the low-pressure spool of the turbomachine.

This is preferably an aircraft jet engine.

STATE OF THE ART

In some turbofan turbomachines, the single fan is driven by a gear box arranged axially between a gas generator and said fan. The implementation of a gear box enables an increase in the diameter of the fan, and thus helps achieve a higher bypass ratio, generating a better performance.

Usually, the gear box is placed under the primary channel of the turbomachine, also referred to as primary jet. Implementing the gear at this particular location of the turbomachine, firstly, results in constraining the size of the primary channel, which can have a negative impact on the flow of the primary flow through the channel. Further, since the gear box is surrounded by the primary channel, the latter has an inner diameter required due to the presence of the gear box. This leads to a size of the primary channel which is not perfectly optimized. The oversized inner diameter of the primary channel also has consequences for the overall size of the turbine engine, since for aerodynamic performance reasons, sections of the primary and secondary channels are closely related. In addition, the desire to obtain a high bypass ratio, greater than or equal to 5, is achieved through the implementation of a large output section for the secondary channel. This large output section of the secondary channel, coupled with the fact that this channel has a high inner diameter dictated by the oversized primary channel, necessarily results in a high outer diameter to the secondary channel, which is detrimental to the radial size and overall weight of the engine.

In addition, to benefit from a low-pressure compressor with satisfactory performance, it must have a small inner diameter. To obtain this small inner diameter while maintaining a not too high slope in the primary channel, the presence of gear box leads to greatly distancing the low-pressure compressor in the axial downstream direction, which is detrimental to the size of the motor in the same direction.

To reduce the radial dimensions of the turbomachine, it is possible to reduce the radial dimension of the inter-duct compartment between the two channels. However, such size reduction renders the implantation of equipment in the inter-duct compartment difficult. The latter is already congested by the presence of structural flanges allowing the transmission of forces from the fan and the gear box in the direction of the outer stator casing of the turbomachine.

In addition, the position of the gear box at the right of the primary channel makes the force pathway fairly complex up to the aircraft structure on to which the turbomachine is connected, especially when the gear box is arranged in cantilever. This led to the addition of structural reinforcements that increase the bulk and the overall weight of the engine.

There is therefore a need to optimize high bypass ratio single fan turbomachines, so as to reach a satisfactory compromise in terms of size, overall weight, performance and acoustics.

SUMMARY OF THE INVENTION

To respond at least partially to this need, the invention relates to a front portion of a turbofan aircraft turbine engine and having a higher bypass ratio or equal to 5, the front portion comprising a single fan surrounded by a fan casing, a gas generator arranged downstream of the fan and including a compressor, preferably a low-pressure compressor, a gear box interposed between the gas generator and the fan, a flow separation nozzle separating a primary channel and a channel secondary of the turbomachine, and a structure arranged downstream of the fan and comprising outlet guide vanes and an outer shroud which is fixed on the head of each one of the outlet guide vanes, said outer shroud extending downstream said fan casing, the single fan comprising a fan hub guided by a rolling bearing for recycling the radial forces of the fan, said rolling bearing being supported by a bearing support member, characterized in that at least some of the outlet guide vanes transmit forces structurally, in particular for the transmission of forces from the rolling bearing and the gear box, and towards an engine mount for attaching the turbomachine to a structural element of the aircraft, said engine mount being attached to said outer shroud to the right structural outlet guide vanes, in that in an axial half-section of the turbomachine front portion passing through one of the outlet guide vanes, said vane extends along a first direction forming an angle less than 30° with a second direction along which said bearing support extends, the outer radial end of which is fixed to the foot of the outlet guide vanes, the foot being arranged upstream of the flow separation nozzle, in that said gear box, connected to the bearing support member and arranged completely upstream of the compressor, has a median transverse plane (P1) located upstream of said flow separation nozzle, and in that in an axial half section of the front part for a turbomachine, at a location of the fan corresponding to 90% of the height of the trailing edge of the fan blades from of the root thereof, the axial length between the trailing edge of the fan blades and the leading edge of the outlet guide vanes, is at least 1.5 times greater than the axial length of the fan blades.

Overall, the invention contrasts with conventional single fan designs in that the outlet guide vanes and the gear box are offset upstream. This leads to many advantages, including a straighter and more direct force pathway between the fan and the engine mount. Indeed, the placement of the outlet guide vanes upstream of the flow separation nozzle, these structural vanes are close to the fan and may be arranged substantially in alignment with the bearing support member, even if an angle of up to 30° is allowed between these two elements. The radial forces coming from the fan, thus, are transmitted thoroughly and directly by the rolling bearing, the bearing support member, structural outlet guide vanes, the outer shroud and the engine mount. Because of the direct, short and substantially straight force pathway, the gear box connected to the bearing support member is not at all or only very slightly affected by the force coming from the fan. This radial force pathway coming from the fan bypasses the gear box, which therefore does not need to be reinforced to resist any interference constraint. This lack of reinforcement is beneficial in terms of size and overall weight.

The design of the invention also greatly reduces or even completely removes the overhang of the gear box, the forces emanating from which can easily pass through the bearing support member, structural outlet guide vanes, and then the engine mount dedicated for this purpose. Because of this more direct force pathway, the need for mechanical reinforcements is greatly reduced, reducing the radial size and the overall weight of the engine.

In addition, the arrangement of the gear box at least partly upstream of the separation nozzle has the advantage of lesser constraint on the size of the primary channel, and thus improves the flow of the primary flow through the channel. In particular, the size of each gooseneck in the primary channel can be adjusted optimally, without this having any negative impact on the sizing of the surrounding elements. This results in better overall aerodynamic performance. By way of illustrative examples, the size chosen for the primary channel may thus freely depend on criteria such as the aerodynamic load, the flow rate of the compressor head, etc.

In addition, since the gear box is no longer surrounded by the compressor arranged in the primary channel 16, the inner diameter of the compressor is less impacted by the gear box, or not impacted at all. It thus is possible to provide a small inside diameter for the compressor without moving same axially downstream and while maintaining a primary channel with a reasonable slope. The axial size is reduced, and the compressor performance is improved.

It is noted that by reducing the inner diameter of the primary channel and the compressor, the entire design of the turbine engine can be improved while retaining the freedom to adapt the section of the secondary channel to the purposes of the primary channel for optimizing aerodynamic performance. Compared to the solutions of the prior art, it is especially possible to achieve the same bypass rate with a significantly reduced overall footprint.

This space saving can be judiciously utilized to maintain an inter-duct compartment with reasonable size for the installation of equipment. Moreover, the displacement of the structure at least in part upstream of the separation nozzle with the outlet guide vanes thereof throughout the entire stream, also has the advantage of being able to move the gear box upstream. In this arrangement, the presence of structural plates in the inter-duct compartment is no longer required, since the force is recovered upstream of the separation nozzle. In addition, to providing a more thorough force recovery due to the greater axial closeness between the structural outlet guide vanes and the gear box, this arrangement saves space in the inter-duct compartment for installation of the equipment and for anti-fire functions.

In addition, the positioning of the gear box at least partially upstream of the separation nozzle allows same to be placed in a large volume zone of the turbomachine. The gear box may thus have a high radial dimension without being restricted by the surrounding area, said radial sizing being directly dependent on the desired reduction ratio. With the present invention, the gear box is then advantageously arranged in an area where it may have a high reduction ratio, for example greater than two.

With this particular positioning of the gear box, it is therefore closer to the structural outlet guide vanes, which are for their part, placed in the total flow, upstream of the separation nozzle. This contrasts with the solutions of the prior art in which the outlet guide vanes were located in the secondary flow, downstream and close to the separation nozzle. Because of nozzle defrosting, said vanes must be strengthened to withstand thermal stresses. In the invention, these constraints no longer exist on the outlet guide vanes, which can thus be reduced. Also, since the vanes are located upstream of the nozzle in the total flow, it is no longer necessary to install a rectifier in the primary channel upstream of the compressor, which further reduces the overall weight.

Finally, at the top of fan blades, the minimum axial length required between the fan and the outlet guide vanes, in terms of acoustic stress, may lead to tilting the vanes so that their head is located more downstream than their root. This inclination appears not only advantageous for controlling acoustic interactions between the fan and the outlet guide vanes, but also simultaneously facilitates substantial alignment between said vanes and the bearing support, guaranteeing the direct radial force pathway from the fan.

The invention further has at least one of the following optional features, taken individually or in combination.

To further strengthen or all of the aforesaid advantages, said gear box is located completely upstream of the separation nozzle and/or said angle A is less than 20°.

Preferably, said engine mount is configured to provide the recovery of vertical force, and preferably also of the transverse forces.

The gear box includes a gear train. This gear train is preferentially either planetary or epicyclic. It is noted that conventionally, the gear train is called epicyclic gear when the ring is rotationally fixed, while it is called planetary gear when the planet carrier is rotationally fixed.

The gear box comprises a ring, preferably attached to the bearing support member.

Preferably, the gear box comprises a planet carrier secured in rotation with said fan hub and being located in the axial extension thereof, said turbomachine front portion comprising a rolling bearing for recovery of the axial forces of the fan, said rolling bearing being supported by an additional bearing support member connected to said bearing support member.

The turbomachine front portion includes a shaft, and said structure at least internally bears a stator structural element connecting this structure to a rolling bearing support member guiding said shaft.

Preferably, said gear is arranged axially between said rolling bearing guiding said fan, and said rolling bearing guiding said shaft.

Said structure comprises an inner shroud to which the roots of the structural outlet guide vanes are fixed, said inner shroud at least partially masking an input of the primary channel, along a longitudinal direction of the turbomachine.

The invention also relates to a turbofan aircraft turbine engine comprising a front portion as described above. Preferably, it is a single-fan jet engine.

Other advantages and features of the invention appear in the following detailed non-limiting description below.

BRIEF DESCRIPTION OF THE DRAWINGS

This description will be made with reference to the accompanying drawings in which.

DETAILED DESCRIPTION OF PREFERRED EMBODIMENTS

Figure 1:
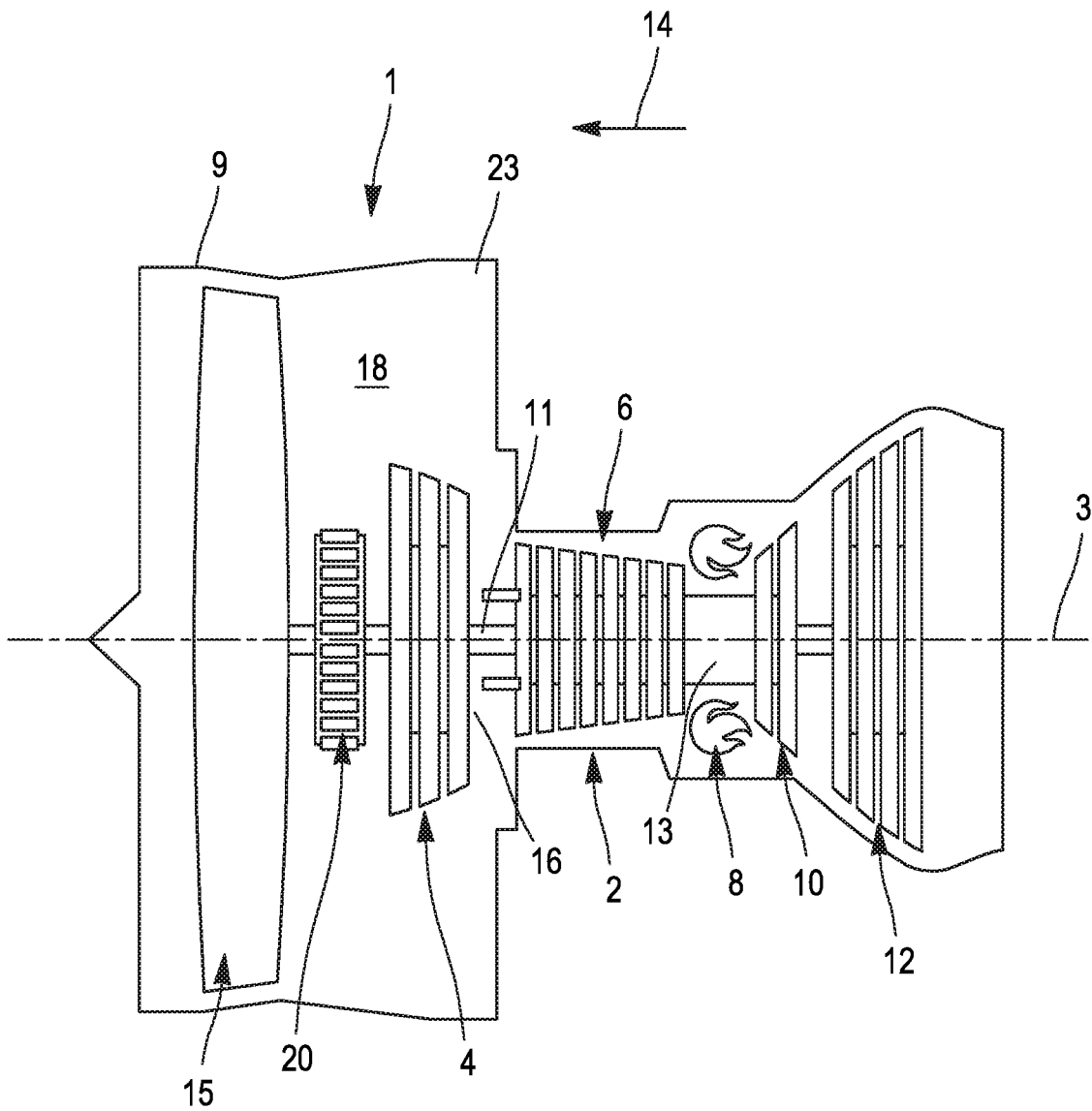
FIG. 1 shows a schematic side view of a jet engine according to the invention.
Figure 2:
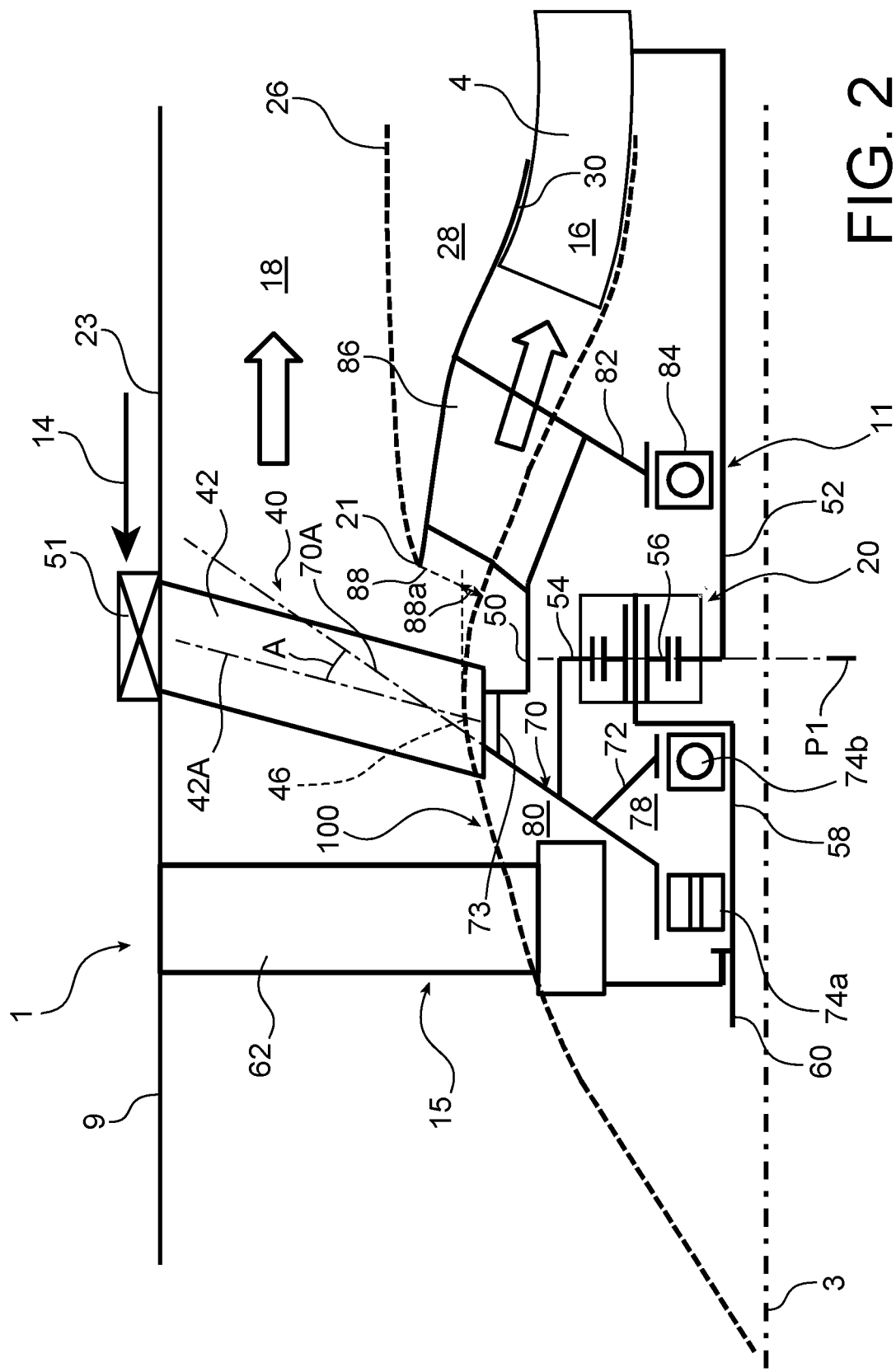
FIG. 2 shows an enlarged, more detailed view of a front portion of the jet engine shown in the previous figure, according to a preferred embodiment of the invention

Referring to FIGS. 1 and 2, there is a jet engine shown 1 with a dual-body turbofan having a high bypass ratio. Said bypass rate, also referred to as BPR (standing for "Bypass Ratio") is greater than or equal to 5 and preferably between 5 and 50. This bypass rate corresponds to the conventional sense, such that it is particularly defined in English by the EASA (standing for "European Aviation Safety Agency") as follows: "The ratio of the air mass flow through the by-pass jets of a gas turbine engine to the air mass flow through the engine core, calculated at maximum thrust when the engine is stationary in an international standard atmosphere at sea level".

A strong hub ratio is also provided, between 0.15 and 0.4. This hub ratio also corresponds to the conventional sense, that is to say, it is defined by the ratio between the diameter of the hub to the leading edge of the fan blades, and the diameter of the fan at the leading edge.

The jet engine 1 conventionally comprises a gas generator 2 on either side of which are arranged a low-pressure compressor 4 and a low-pressure turbine 12, the gas generator 2 including a high-pressure compressor 6, a combustion chamber 8 and a high-pressure turbine 10. Subsequently, the terms "front" and "rear" are considered in a direction 14 opposite to the main flow direction of gas within the jet engine, this direction 14 being parallel to the axis 3 longitudinal thereof. However, the terms "upstream" and "downstream" are considered as the main gas flow direction within the jet engine.

The low-pressure compressor 4 and the low-pressure turbine 12 form a low-pressure spool, and are connected to each other by a low-pressure shaft 11 centred on the axis 3. Similarly, the high-pressure compressor 6 and the high-pressure turbine 10 form a high-pressure body and are connected to each other by a high-pressure shaft 13 centred on the axis 3 and arranged around the low-pressure shaft 11.

The jet engine 1 further comprises, at the front of the gas generator 2 and the low-pressure compressor 4, a single fan 15. A single fan is understood to mean a single ring-shaped row of fan blades, all rotating in the same direction by being attached to the same fan hub. This single-fan jet engine thus contrasts sharply with the double contrarotating fan turbomachines (known as "contrafan"), the operation and design of which differ widely.

The single fan 15 is rotatable about the axis 3, and surrounded by a fan casing 9. Said fan is not directly driven by the low-pressure shaft 11, but only indirectly driven by said shaft, which allows same to rotate with a slower speed. Indeed, a gear box 20 is arranged between the low-pressure body and the fan 15, being arranged axially between the latter and the low-pressure compressor 4. The presence of the gear box 20 to drive the fan 15 makes it possible to provide a larger diameter fan, and therefore promotes the obtaining of a high bypass ratio, ensuring fuel consumption gain. The reduction ratio provided by the gear box 20 is preferably greater than 1.5, and even more preferably greater than 2.

Furthermore, the jet engine 1 defines a primary channel 16 intended to be traversed by a primary flow and a secondary channel 18 intended to be crossed by a secondary flow located radially outward relative to the primary flow. As is known to those skilled in the art, the secondary channel 18 is radially defined outwards by an outer shroud 23, preferably made of metal, extending rearwardly fan housing 9.

In addition, the secondary channel 18 is radially defined inwards by an inner boundary surface 26, externally defining an inter-duct compartment 28, visible in FIG. 2. The inter-duct compartment 28 is also defined at the front by a flow separation nozzle 21, and radially inward by a shroud 30 enclosing the low-pressure compressor 4 mentioned hereinbefore.

Although this has not been shown, the jet engine 1 is equipped with a set of equipment, for example such as a fuel pump, hydraulic pump, alternator, starter, variable stator actuator (VSV), discharge valve actuator, or electric power generator. These include equipment for lubricating the gear box 20.

Referring more specifically to FIG. 2, the gear box 20 comprises a epicyclic gear train, which comprises firstly a planetary gear 52 centred on the axis 3 and to rotate with the low-pressure shaft 11, being arranged in the axial extension in front of said shaft 11. The two elements 11, 52 may be formed in one piece, or preferably fixedly connected one on to the other. The gear train also has an outer ring 54, rigidly connected to a stator of the jet engine. Planet pinions 56 are also foreseen, meshing with the outer ring 54 and the planetary gear 52. Finally, the epicyclic gear train comprises a planet carrier 58 rotatably connected to a fan hub 60 carrying the fan blades 62. The planet carrier 58 is located in the axial extension of the hub 60. Here too, the two elements 58, 60 can be made of one piece, or preferably fixedly connected one on to the other. In another possible configuration not shown, called a planetary gear, the planet carrier 58 is fixed to the stator of the jet engine, and the outer ring 54 is constrained to rotate with the fan hub 60.

Still referring to FIG. 2, an assembly 100 is shown forming part of the jet engine 1. The assembly 100 includes a first rolling bearing bracket 70 forming part of the stator of the jet engine 1.

The bearing support member 70 takes the form of a flange centred on the axis 3 and opening downstream. It supports a rolling bearing 74a engaging with the fan hub 60. The bearing 74a is the foremost bearing of the turbomachine. It is designed to recover the radial forces of the fan, preferably with a design, called roller design.

In addition, further downstream another rolling bearing 74b is provided, engaging with the hub 60 and the planet carrier 58 located in the extension thereof. The bearing 74b is designed to recover the axial loads of the fan, preferably with a design, called bearing design. It is supported by an additional support bearing 71, fixedly connected to the support member 70 mentioned hereinbefore. The additional support member 71 also takes the form of a flange of smaller size and opening forwardly. It is connected to the support member 70 closer to the axis 3 than the ring 54, which also fixedly connects directly to the bearing support member 70.

The two bearings 74a, 74b guide a rotary assembly adapted to be driven by the gas generator 2, the assembly thus comprising the planet carrier 58 of the gear box and the hub 60 of the fan.

The bearing support member 70 and the additional support member 71 are centred on the axis 3. They together define a radially inner space 78 in which are placed the bearings 74a, 74b, and form part of a lubrication chamber. The support members 70, 71 are made using one integral piece, or using several pieces attached to each other. They form a V in axial half-section, the V being open radially inwards and defining an inclination angle of about 90° between the two portions.

The assembly 100 further comprises a radial elements structure 40 consisting of outlet guide vanes 42 (or OGV, i.e. "outlet guide vanes"). These vanes 42, besides the fact that they exhibit an airfoil for rectifying the airflow escaping from the single fan 15, also exhibit at least some of them a structural character force transmission. Preferably, these are all the vanes 42 which are structural, in that they allow in particular the transmission of forces from the fan 15 and the gear box 20, and toward an engine mount 51 fixed to the outer shroud 23, the right of the vanes 42.

The vanes 42 are uniformly distributed about the axis 3, and connect the outer shroud 23 integral with the structure 40, to an inner shroud 46 of this structure, located upstream of the separation nozzle 21. More specifically, the head of the vanes 42 is fixed to the outer shroud 23, while the root of the vanes is fixed to the inner shroud 46.

Also, one of the features of the invention lies in the fact of arranging the outlet guide vanes 42 upstream of the separation nozzle. Therefore, the secondary channel 18 is thus free from any radial element junction between the elements 23, 26, upstream of the combustion chamber. Thus, these structural outlet guide vanes 42 lead radially through the entire stream, to the front of the nozzle 21, without passing through said nozzle.

These vanes 42 may be inclined downstream in going radially outward, without necessarily bringing their heads downstream of the flow separation nozzle 21. The angle of inclination of the vanes 42 may be provided between 30 and 60° relative to the axial direction. In this respect, it is stated that in axial half-section through one of the vanes 42, such that the half-section of FIG. 2, the vane 42 thus extends in a first direction inclined 42A value indicated hereinbefore. Also in this half-section, the bearing support member 70 extends in a second direction 70A inclined at between 30 and 60° relative to the axial direction, and preferably of the order of 45°. This provides a very direct and substantially straight force pathway between the bearing bracket 70 and the vanes 42 at the root of which is fixed the support member 70, since the angle A between the first and second directions 42A, 70A is less than 30° or even less than 20°.

Thus, the radial load from the fan hub 60 passes substantially straight and directly through the bearing 74a, support member 70 whose radially outer ends are fixed to the root of the outlet guide vanes 42, through the same vanes 42, then through the outer shroud 23 and the engine mount 51.

This particularly makes it possible to work around the gear box 20, and not to subject same to large radial forces coming from the fan.

An axial overlap is also preferably provided, at least partially, on the one hand between the root of the vanes 42 and the crown 54 of the gear box 20, and on the other hand between the root of the vanes 42 and the downstream roller bearing 74b guiding the fan hub 60 and the planet carrier 58. In order to obtain a very thorough force path, the engine mount 51, structural outlet guide vanes 42 and the gear box 20 are crossed by the same imaginary plane of the engine. From the gear box 20, the force can thus pass through the ring 54, the flange 70, the vanes 42, the outer shroud 23 and the engine mount 51 shown only schematically in FIG. 2. The engine mount 51 is intended for attaching the motor on to a part of the aircraft structure, preferably by being connected to an engine mount, for example located under the wing of the aircraft. As indicated above, the engine mount 51 is attached to the outer shroud 23 to the right of vanes 42 and is preferably configured to ensure the recovery of the vertical and transverse forces. Force in the axial direction is recovered conventionally by the lateral rods for thrust recovery, which are connected over a downstream portion of the turbomachine.

Analogously to that shown for the bearing support member 70, the structure 40 carries internally, from the inner shroud 46 thereof and/or the root of the vanes 42 thereof, a flange-shaped stator structural element 50 connecting the structure 40 to support element 82 of a rolling bearing 84, guiding the low-pressure shaft 11. The bearing bracket 82 is also mounted on the arm 86 of an input casing, said arms passing through the primary channel 16 upstream of the low-pressure compressor 4.

The arms 86 are thus arranged axially between the bearing holder 82 and the stator structural element 50, the latter projecting inwardly in the vanes 42 as the bearing support member 70 to which it is connected via a structural connecting part 73, leading axially between the inner shroud 46 and the ring 54.

With this design, the axial forces coming from the fan pass successively through the rolling bearing balls 74b, the additional support member 71, the support member 70, the structural connection piece 73, the stator structural element 50 and arms 86, before crossing downstream to other engine mounts.

The arms of the inlet housing 86 are arranged immediately downstream of an inlet 88 of the primary jet 16, located at the flow separation nozzle 21. As shown diagrammatically in FIG. 2, in the direction of the axis 3, the radially inner portion 88a of the inlet 88 is hidden by the internal shroud 46 of larger diameter. This advantageously allows the protection of the primary stream against external hazards such as taking in foreign bodies. The hidden nature of the input 88 of the primary jet 16 is made possible in particular by a small radial sizing of this channel 16. Such reduced sizing can be applied due to a specific feature of the invention, for placing the gear box 20 partly upstream of the separation nozzle. Also, the inner diameter of the primary channel 16 is not at all or only slightly constrained by the presence of the gear arranged axially between the rolling bearings 74a, 74b guiding the single fan 15, and the rolling bearing 84 guiding the low-pressure shaft 11.

In doing so, the size and the dimensioning of the channels 16, 18 and the low-pressure compressor 4 remain freer, leading to a reduction in the overall size of the turbine engine and optimized aerodynamic performance.

More specifically, the gear box 20 is arranged upstream in entirety the low-pressure compressor 4, and has a median transverse plane P1 located upstream of the flow separation nozzle 21. In other words, it is located at least half in upstream of the nozzle, although it is preferably the entirety of the gear box which is arranged upstream of the nozzle 21. This allows it to have a large radial size, suitable for obtaining the desired reduction of the strong ratio.

Figure 3:
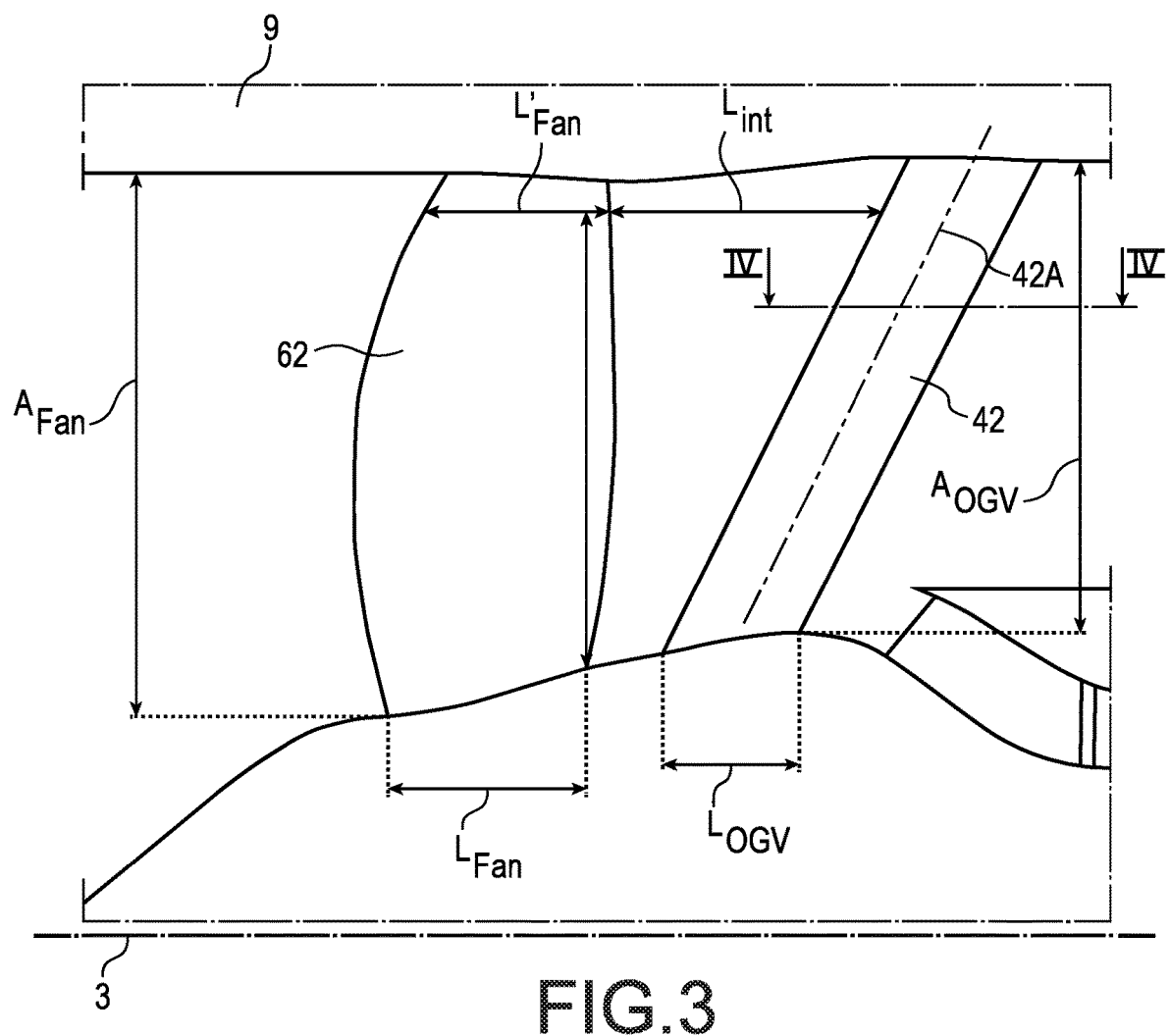
FIG. 3 is a view of the front portion of the jet engine, on which different geometric parameters were identified.
Figure 4:
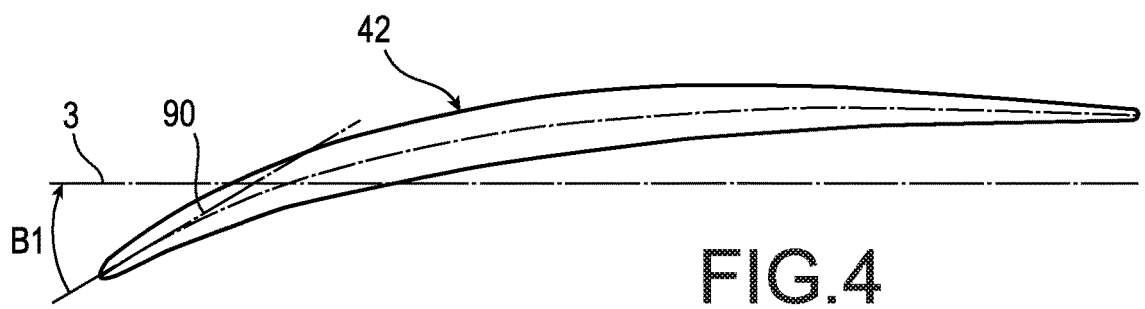
FIG. 4 corresponds to a sectional view taken along the line IV-IV of FIG. 3.

Referring to FIGS. 3 and 4, there is shown various geometrical parameters for the structural outlet guide vanes 42, allowing the latter to obtain high aerodynamic performance downstream of the fan blades 62. FIG. 3 shows that the passage section at the outlet of outlet guide vanes 42, referenced $A_{OGV}$, represents at least 65% of the passage section at the inlet of the fan blades 62, referenced $A_{Fan}$, in FIG. 3.

In addition, the axial length of the root of each guide vane 42, referenced $L_{OGV}$, in FIG. 3, corresponds to at least 60% of the axial length $L_{Fan}$ foot of each fan blade 62.

As mentioned hereinbefore, each blade 42 has a twist for the rectification of the stream leaving the fan. This twisting is particularly characterized by an angle B1 beside higher attack to 20° relative to the longitudinal axis 3, at least on one of the cross-sections thereof such as that shown in FIG. 4. In fact, this angle retrieves the gyrating flow from the trailing edge of the fan blades. Here, the angle at the leading edge B1 is measured between the skeleton line 90 of the profile edge (conventionally defined as the line equidistant from the intrados and the extrados of the blade 42) and the axis 3. In addition, the trailing edge is preferably oriented in the direction of the axis 3, as can be seen in FIG. 4.

Finally, to limit the acoustic interaction between the fan 15 and the structural outlet guide vanes 42, in axial half-section such as that of FIG. 3, and at a location of the fan corresponding to 90% of the height of the trailing edge of the fan blades starting from their base, the axial length $L_{int}$ between the trailing edge of the fan blades 62 and the leading edge of the outlet guide vanes 42, is at least 1.5 times greater than the axial length the $L'_{fan}$ fan blades. The relationship between these lengths is even more preferably greater than 2, and the 10% height remaining on the blades, which corresponds to 10% of the total external jet. In order to do this and due to the proximity between the blade roots 42, 62, the vanes 42 are rearwardly inclined going radially outward, with the first direction 42A with the aforesaid inclination value.

Of course, various modifications can be made by the person skilled in the art to the invention just described, solely as non-limiting examples.

The invention claimed is:

1. A front section of a turbomachine for a turbofan aircraft, the front section comprising:
    a single fan surrounded by a fan casing;
    a gas generator arranged downstream of the single fan and comprising a low pressure compressor;
    a gear box interposed between the gas generator and the single fan;
    a flow separation nozzle between a primary channel and a secondary channel of the turbomachine; and
    a structure arranged downstream of the single fan and comprising outlet guide vanes and an outer shroud on which is fixed a head of each of the outlet guide vanes, said outer shroud extending downstream of said fan casing, the single fan comprising a fan hub guided by a rolling bearing that supports radial forces from the single fan, said rolling bearing being supported by a bearing support member,
    wherein some of the outlet guide vanes have a structural character of force transmission and configured to transmit forces from the rolling bearing and the gear box toward an engine mount to ensure fixing of the turbomachine to a structural element of the turbofan aircraft, said engine mount being secured to said outer shroud and to the structural outlet guide vanes,
    wherein, in an axial cross-section of the front section of the turbomachine passing through one of the outlet guide vanes, said one of the outlet guide vanes extends along a first direction forming an angle of less than 30° with a second direction that extends along said bearing support member having an outer radial end that is attached to a root of said one of the outlet guide vanes, the root being arranged upstream of the flow separation nozzle,
    wherein said gear box, which is connected to the bearing support member and entirely arranged upstream of the low pressure compressor, has a central transverse plane located upstream of said flow separation nozzle, and
    wherein in the axial cross-section of the front section of the turbomachine, at a location of the single fan corresponding to 90% of a height of a trailing edge of each of a plurality of fan blades of the single fan starting from a base of the fan blades, an axial length separating the trailing edge of each of the plurality of fan blades of the single fan and a leading edge of each of the outlet guide vanes, is at least 1.5 times greater than an axial length of the plurality of fan blades of the single fan.

2. The front section of a turbomachine according to claim 1, wherein said gear box is entirely upstream of the flow separation nozzle.

3. The front section of a turbomachine according to claim 1, wherein said angle is less than 20°.

4. The front section of a turbomachine according to claim 1, wherein said engine mount is configured to support vertical forces.

5. The front section of a turbomachine according to claim 1, wherein the gear box comprises a gear train.

6. The front section of a turbomachine according to claim 5, wherein the gear box comprises a ring fixed to the bearing support member.

7. The front section of a turbomachine according to claim 5, wherein the gear box comprises a planet carrier integral in rotation with said fan hub and lying in an axial extension of said fan hub, said front section of turbomachine comprising another rolling bearing for supporting axial forces of the single fan, said another rolling bearing being supported by an additional bearing support member connecting to the bearing support member.

8. The front section of a turbomachine according to claim 1, further comprising a low pressure shaft, wherein said structure carries internally at least one stator structural element connecting the structure to an element for supporting a low pressure shaft guiding rolling bearing which guides said low pressure shaft.

9. The front section of a turbomachine according to claim 8, wherein said gear box is arranged axially between said rolling bearing and said low pressure shaft guiding rolling bearing guiding said low pressure shaft.

10. An aircraft turbofan turbomachine comprising a front section according to claim 1.

11. The front section of a turbomachine according to claim 4, wherein said engine mount is configured to support transverse forces.

12. The front section of a turbomachine according to claim 5, wherein the gear train is epicyclic or planetary.

* * * * *